(12) United States Patent
Horn

(10) Patent No.: US 6,578,468 B1
(45) Date of Patent: Jun. 17, 2003

(54) CONTINUOUS MIXER OR STIR FRY COOKER

(76) Inventor: Darrell C. Horn, 3707 Llyn Glaslyn Pl., Santa Rosa, CA (US) 95403

( * ) Notice: Subject to any disclaimer, the term of this patent is extended or adjusted under 35 U.S.C. 154(b) by 0 days.

(21) Appl. No.: 10/129,317

(22) PCT Filed: Nov. 6, 2000

(86) PCT No.: PCT/US00/41959
§ 371 (c)(1),
(2), (4) Date: May 3, 2002

(87) PCT Pub. No.: WO01/33974
PCT Pub. Date: May 17, 2001

Related U.S. Application Data
(60) Provisional application No. 60/164,086, filed on Nov. 6, 1999.

(51) Int. Cl.[7] .................................................. A23L 1/00
(52) U.S. Cl. ........................... 99/334; 99/348; 366/144; 366/146; 366/318
(58) Field of Search .......................... 99/325–335, 348, 99/357, 352–355, 403–410, 468, 483; 366/144–149, 194–196, 318–324; 126/391.1; 426/520, 523, 519, 438

(56) References Cited

U.S. PATENT DOCUMENTS

| | | | | |
|---|---|---|---|---|
| 2,011,699 A | * | 8/1935 | Amend | ...................... 99/348 X |
| 3,635,147 A | * | 1/1972 | Lee | ............................... 99/348 |
| 3,805,687 A | * | 4/1974 | Van De Klundert | ........... 99/352 |
| 4,197,018 A | * | 4/1980 | Groen, Jr. | .................. 99/348 X |
| 4,274,751 A | * | 6/1981 | Rector et al. | ........... 366/119 X |
| 4,444,553 A | * | 4/1984 | Christodoulou | ........... 99/443 C |
| 4,733,607 A | * | 3/1988 | Star et al. | ...................... 99/348 |
| 5,083,506 A | * | 1/1992 | Horn et al. | .................... 99/348 |
| 5,233,916 A | * | 8/1993 | Butler et al. | ................... 99/325 |

* cited by examiner

*Primary Examiner*—Timothy F. Simone
(74) *Attorney, Agent, or Firm*—Larry D. Johnson; Craig M. Stainbrook; Johnson & Stainbrook, LLP

(57) ABSTRACT

An apparatus for continuously mixing food products or for continuous high temperature frying on a heat exchange surface. The rotation of an agitator (12) pushes the food product toward the discharge outlet (26) of the apparatus when the agitator is rotated in one direction, and toward the inlet (24) when rotated in the opposite direction. By rotating the agitator slightly longer in the discharge direction than in the inlet direction the product is conveyed gradually and continuously toward the outlet. During the rotation of the agitator in each direction the product is tossed and mixed to promote even frying.

9 Claims, 2 Drawing Sheets

CONTINUOUS MIXER OR STIR FRY COOKER

CONTINUOUS MIXER OR STIR FRY COOKER

This application is a 371 of PCT/US 00/41959, filed Nov. 6, 2000 which claims benefit of Ser. No. 60/164,086, filed Nov. 6, 1999.

TECHNICAL FIELD

The present invention relates generally to food processing equipment, and more particularly to an apparatus for continuous mixing or stir fry cooking of foods such as meats and vegetables.

BACKGROUND ART

The stir frying of meats and vegetables without the use of oil has become increasingly popular in recent years as the population has become more health conscious. Frying adds a unique taste to the food product while the use of no cooking oil (or at least very little) minimizes the amount of fat in the diet. By quickly frying vegetable products on a very high temperature heated surface (e.g., 425° F. to 600° F.) the enzymes are killed which increases shelf life, while the vegetable product maintains a crisp, fresh texture. This frying process has been used for centuries by the Asian population and in recent years has become very popular in the Western World.

The current methods of stir frying in the industrial food industry are all batch processes. A certain volume of food product is loaded into a frying vessel and stirred for a predetermined time period and then removed, and as quickly as possible thereafter the next batch is loaded. The problems associated with this batch method of stir frying are as follows:

1. Very little food product can be fried at one time. If the layer of product on the heated surface is more than 2 or 3 inches deep, the portion of the product being heated on the bottom layer gives off steam as the moisture in the product fries. This steam rises through the product above, thereby steam cooking it. If the product layers are deeper than 2–3 inches the portion of the product in the upper layers is steamed and not fried, and therefore becomes limp and soggy. For this reason the food product must be spread out in a relatively thin layer over a very large area to fry properly. This dramatically complicates the mechanical stirring of the product.

2. When batch cooking, approximately 50% of the processing time is either spent loading or unloading the product from the frying vessel. Given the small batch sizes required for proper stir frying as described above, the production rate possible in a traditional industrial fryer is very small resulting in very poor economies.

3. During the time when there is no food product in the batch frier (i.e., between the unloading and loading steps) the heated surfaces tend to over fry or burn the small amount of product that always remains after unloading. This small amount of burned product taints the next batch with off flavors.

These batch frying problems are dramatically reduced if the food product is continuously fed into a fryer and is continuously discharged. Continuous fryers have been developed that are designed similar to a screw conveyor with mixing bars or scrapes attached to the conveyor flights. However, the problem with known continuous fryers is that in order to obtain an adequate frying time (e.g., 10–15 minutes) the cooker must either be very long, or the screw must move very slowly, or both. If the screw moves very slowly, the product is not mixed adequately and does not fry evenly. If the machine is very long (e.g., 26–28 feet), the machine is very expensive and very difficult to design to avoid warping due to the high temperatures (if the machine warps the screws will rub the sides of the trough).

Even if the problems listed above are solved, the screw rotating in one direction conveys the product off the center line of the machine, piling it up on one side so that the heat exchange surface is not evenly covered. The result is that continuous screw fryers are not efficient.

The continuous mixing of food products (without frying) is also becoming increasingly important as processors look for ways to increase productivity and decrease manual labor involvement. Combining the conveying of food products with the mixing of these products is difficult for the same reasons as stated above, since the speed of conveying is usually quite slow and therefore the rotation of the conveyor auger is too slow to properly mix the products.

DISCLOSURE OF INVENTION

The continuous mixer or stir fry cooker apparatus of this invention provides a single agitator mechanism made by attaching conveying/agitating structures such as paddles or solid, continuous spiral flights to a shaft which is driven from one end about its longitudinal axis. The agitator is mounted in a trough with bearings holding the shaft at each end in such a manner as to allow the agitator to rotate freely in either direction. The shaft is driven by a reversible drive motor. Mounted on the paddles or spiral flights are lifting bars (in the case of a continuous mixer) or scrapers (in the case of a continuous fryer) which scrape the sides of the trough as well as mix or toss the food product as the agitator rotates.

The invention uses an automatic reversing system to cycle the agitator of the continuous mixer or cooker back and forth by reversing the shaft on a preprogrammed basis. The control system of the agitator is preferably programmable to allow setting the time the agitator rotates in one direction (e.g., conveying the food product from the inlet of the machine toward the outlet) and then reversing the agitator for a timed period of rotation in the opposite direction. By rotating the agitator for a period of time in the direction that conveys the product from the inlet toward the outlet, and then rotating it in the opposite direction for a shorter period of time, the product is gradually, continuously conveyed toward the outlet.

By repeating the forward, reverse cycle over and over with a fast RPM the product is vigorously stirred or tossed back and forth, assuring thorough mixing (in the case of a continuous mixer) and frequent contact of the product pieces with the heat exchange surface to maximize the frying of the product (in the case of a continuous fryer), at the same time the product is conveyed slowly toward the discharge end of the machine.

BEST MODE FOR CARRYING OUT THE INVENTION

Figure 1:
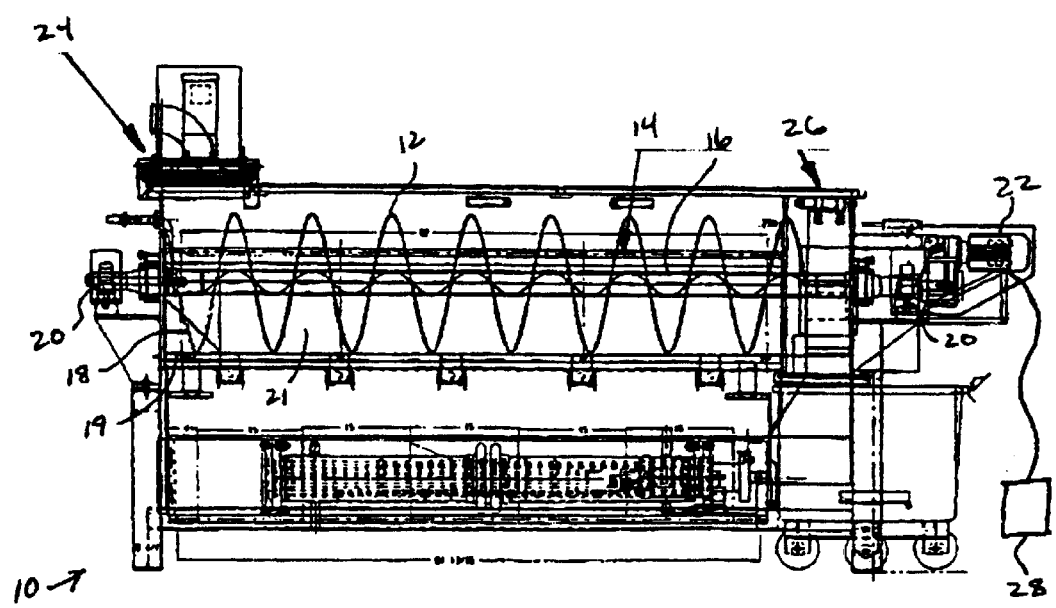
FIG. 1 is a side elevation cross-sectional view of a continuous mixer or stir fry cooker of this invention.

FIG. 1 is a side elevation cross-sectional view of the inventive apparatus. Mixer or cooker 10 includes a conveying/agitating structure or mechanism 12 such as an agitator screw 14 on longitudinal shaft 16. Agitating mechanism 12 is mounted in an arcuate trough 18 of elongated tub 19 with bearings 20 holding the shaft at each end. In the case of a cooker apparatus, the walls 21 of the trough 18 are heated. Reversible drive motor 22 rotates the shaft 16, and thus the agitating mechanism 12, in both directions. Food product is placed in the inlet end 24 of the continuous mixer/cooker, and removed from the discharge end 26, as is well known in the art. A controller 28, such as a manual controller or a programmable logic circuit (PLC) controls the reversible motor to determine the forward and reverse rotation of the system, again as is well known in the art.

Figure 2:
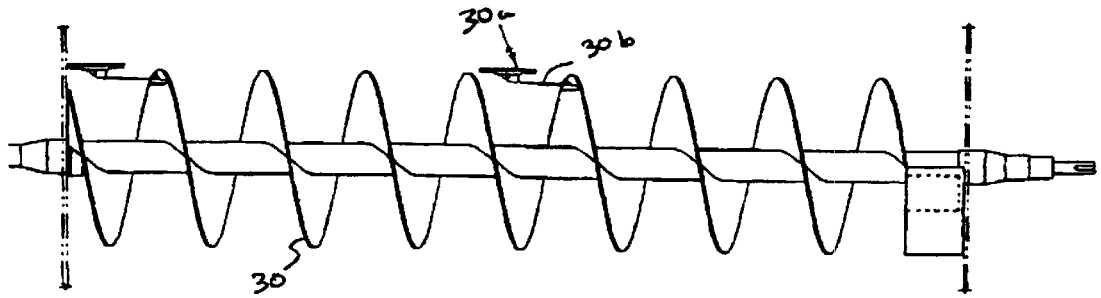
FIG. 2 is a side elevation view of a screw type agitator.
Figure 3:
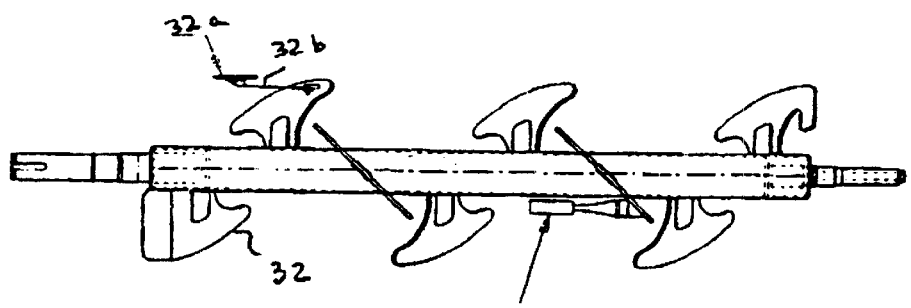
FIG. 3 is a side elevation view of a paddle type agitator.
Figure 4:
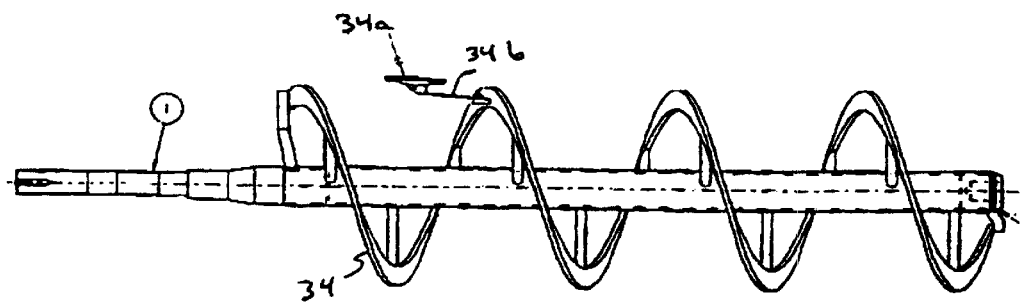
FIG. 4 is a side elevation view of a ribbon type agitator.

FIG. 2 is a side elevation view of a screw type agitator in the form of a solid flight auger 30, with a typical scraper 30a mounted on leaf spring 30b. FIG. 3 illustrates a paddle type agitator 32 with scraper 32a and spring 32b, while FIG. 4 illustrates a ribbon type agitator 34 with scraper 34a and spring 34b. Each of these agitating/conveying structures may be suitable for a particular application.

The timing of the forward and reverse movement of the agitator determines the length of time it takes for the food product to move through the mixer or cooker, and therefore determines the mixing or frying time. The RPM required to vigorously mix or toss the product depends on the diameter or size of the mixer/cooking system. Once the RPM is selected, the forward and reverse time can be set to result in the desired total mixing/frying time. The forward and reverse time settings are preferably very accurate—within 1/10 of a second—and the difference between the forward and reverse time is preferably less than 2.0 seconds.

Some products must rest on the heated surface of a cooker for a time period in order to carmelize or brown properly. This is accomplished by pausing the agitator for a preset time after each forward rotation of the agitator, and/or after each reverse rotation.

The determination of the total mixing or frying time for a food product can be very difficult to determine with the forward rotation time, the reverse rotation time and the pause time all as variables. An alternate embodiment of the invention provides a programmable logic circuit (PLC ) and software program that determines the total frying time after each of these variables is programmed into the PLC. The set up procedure for this system is to select the desired RPM of the agitator to result in proper mixing and tossing of the product, then set the pause time to properly brown the product (if necessary). The reverse time is then set to provide a sufficient rotation of the agitator to toss the product and scrape the heat exchange surface in each cycle. Once these three variables are set, the final setting is the time of forward rotation of the agitator. With the PLC software that calculates the total frying time of the product with one complete pass through the cooker it is quite easy to adjust the forward rotation of the agitator until the PLC read out shows the desired total frying time. This PLC software system can be of a great advantage in the proper setup of this inventive continuous mixing/frying system.

The design of the scraper system can be critical to proper continuous stir frying. The preferred embodiment of the invention utilizes a leaf actuated scraper system which maintains a normal pressure of the plastic scraper blade on the heated surface while at the same time the blade pivots about a center point to always lie flat against the heated surface. This design also allows the plastic scraper blade to twist about the spring mounting point so that when the blade makes contact with stubborn burn-on the leaf spring will twist causing the scraper blade to dig into the burn-on. The more stubborn the burn-on the more effective the scraper. This scraper system scrapes equally well in either direction of rotation of the agitator.

The heated surface of the frying system can either be heated with high pressure steam, heated thermal oil or a natural gas flame. High pressure steam is marginally at a high enough temperature to stir fry products since steam cannot provide temperature above 400° F. Thermal oil on the other hand can be heated to 600° F. Natural gas flame is more difficult to control the temperature of the heated surface, but is still a viable alternative heating source.

While this invention has been described in accordance with preferred embodiments thereof, it is obvious that modifications and changes may be made by those skilled in the art to which it pertains without departing from the spirit and scope of the invention, as defined by the claims appended hereto.

What is claimed is:

1. A continuous mixer for food products comprising:

an elongated tub including an arcuate trough, said tub having an inlet end and an opposing discharge end;

an elongated conveying/agitating structure mounted in said trough, said agitating structure having a longitudinal axis, and adapted for urging a food product in contact therewith to move from said inlet end toward said discharge end when rotated in a first direction, and to move the product toward said inlet end when rotated in a reverse direction;

drive means for rotating said agitating structure about said axis; and control means for operating said drive means to alternately rotate said agitating structure in said first direction and in said reverse direction, with the time of rotation in said first direction greater than the time of rotation in said reverse direction.

2. The continuous mixer of claim 1 wherein said agitating structure comprises a solid flight auger.

3. The continuous mixer of claim 1 wherein said agitating structure comprises a paddle agitator.

4. The continuous mixer of claim 1 wherein said agitating structure comprises a ribbon agitator.

5. The continuous mixer of claim 1 including cooking means to heat said trough.

6. The continuous mixer of claim 5 wherein said agitating structure includes at least one scraper to scrape the trough.

7. The continuous mixer of claim 6 wherein said at least one scraper includes a leaf spring actuated so as to enhance the scraping action.

8. The continuous mixer of claim 1 wherein the agitating structure is adapted to stop and stay motionless for a period of time after each cycle of rotation in each direction.

9. The continuous mixer of claim 1 wherein settings of forward, reverse and pause are entered into a PLC for calculation of the total mixing cycle time based on the RPM of the agitator and the forward, reverse and pause time settings.

* * * * *